(12) United States Patent
Wu

(10) Patent No.: US 7,571,550 B2
(45) Date of Patent: Aug. 11, 2009

(54) STYLUS FOR KEY DUPLICATING MACHINE WITH REPLACEABLE SEGMENTED STYLUS

(75) Inventor: Kuo-Shen Wu, Taipei (TW)

(73) Assignee: East of Wu Co., Ltd., Taipei (TW)

( * ) Notice: Subject to any disclaimer, the term of this patent is extended or adjusted under 35 U.S.C. 154(b) by 131 days.

(21) Appl. No.: 11/594,868

(22) Filed: Nov. 9, 2006

(65) Prior Publication Data

US 2007/0130786 A1 Jun. 14, 2007

(30) Foreign Application Priority Data

Dec. 12, 2005 (TW) .............................. 94221761 U

(51) Int. Cl.
*G01B 5/00* (2006.01)
(52) U.S. Cl. .......................................... 33/559; 33/556
(58) Field of Classification Search ................... 33/559, 33/558.3, 558.05, 556
See application file for complete search history.

(56) References Cited

U.S. PATENT DOCUMENTS

| 3,372,619 | A | * | 3/1968 | Clegg | ........................ | 409/129 |
| 4,187,614 | A | * | 2/1980 | Abiru et al. | .................... | 33/559 |
| 6,344,656 | B1 | * | 2/2002 | Hopkins et al. | ........ | 250/559.22 |
| 7,128,504 | B2 | * | 10/2006 | Wu | .............................. | 409/81 |
| 7,189,037 | B2 | * | 3/2007 | Wu | .............................. | 409/126 |
| 2004/0175246 | A1 | * | 9/2004 | Wu | .............................. | 409/81 |

* cited by examiner

*Primary Examiner*—Yaritza Guadalupe-McCall
(74) *Attorney, Agent, or Firm*—Birch, Stewart, Kolasch & Birch, LLP

(57) ABSTRACT

A stylus for key duplicating machine with replaceable segmented stylus comprising a cylindrical body; a spring-loaded tracer having a slide spindle movably engaged in one end of the cylindrical body, and a replaceable segmented stylus releasably secured on the front end of the slide spindle for replacement of the worn replaceable segmented stylus damaged during key duplicating by new one easily; and a regulating grip angularly movably engaged in the other end of the cylindrical body.

3 Claims, 2 Drawing Sheets

STYLUS FOR KEY DUPLICATING MACHINE WITH REPLACEABLE SEGMENTED STYLUS

BACKGROUND OF THE INVENTION

The present invention relates to a stylus for key duplicating machine, and more particularly to a stylus for key duplicating machine with replaceable segmented stylus which primarily comprises a cylindrical body; a spring-loaded tracer having a slide spindle movably engaged in one end of the cylindrical body, and a replaceable segmented stylus releasably secured on the front end of the slide spindle for replacement of the worn replaceable segmented stylus by new one easily; and a regulating grip angularly movably engaged in the other end of the cylindrical body.

There are two kinds of styluses in the conventional stylus for key duplicating machine for duplicating a key for the cylinder lock which comprises a wave-shaped pattern of the teeth; a stationary wedge-shaped stylus; and a spring-loaded semi-cylindrical stylus having a hypotenuse end. Although both the stationary wedge-shaped stylus and the spring-loaded semi-cylindrical stylus are integrally made by hard material e.g. a medium carbon steel which should be subjected to heat treatment, in order to enhance its hardness during manufacturing, the tip of the stylus which will tightly touch and trace the wave-shaped pattern of the teeth formed on the original key, and be worn out when the same traces the wave-shaped pattern of the teeth frequently during key duplicating. Once the tip of the stylus is seriously worn out, the tracing of the wave-shaped pattern of the teeth formed on the originally key would be inaccurate, and result in an inaccurate key cutting, i.e. inaccurate depths of the formed key teeth. Generally speaking, after the stylus made by the material of the medium carbon steel has been used about 20,000-30,000 times, the tip of the stylus would be seriously worn out while the remainder undamaged parts of the stylus remain useful, and the whole stylus would be thrown away.

The present invention aims at eliminating the above disadvantages and provides a stylus for key duplicating machine with replaceable segmented stylus, wherein a replaceable segmented stylus is provided for use as a tracer, and for replacement of the worn replaceable segmented stylus by new one easily, in order to enhance the accuracy of the key duplicating, and to save the cost of the stylus.

In a preferred aspect of the present invention, the stylus for key duplicating machine with replaceable segmented stylus comprises a cylindrical body; a spring-loaded tracer having a slide spindle movably engaged in one end of the cylindrical body, and a replaceable segmented stylus releasably secured on the front end of the slide spindle for replacement of the worn replaceable segmented stylus by new one easily; and a regulating grip angularly movably engaged in the other end of the cylindrical body.

BRIEF DESCRIPTION OF THE DRAWING

An embodiment of the present invention will now be described by way of example with reference to the accompanying drawings in which.

DETAILED DESCRIPTION OF THE INVENTION

Figure 1:
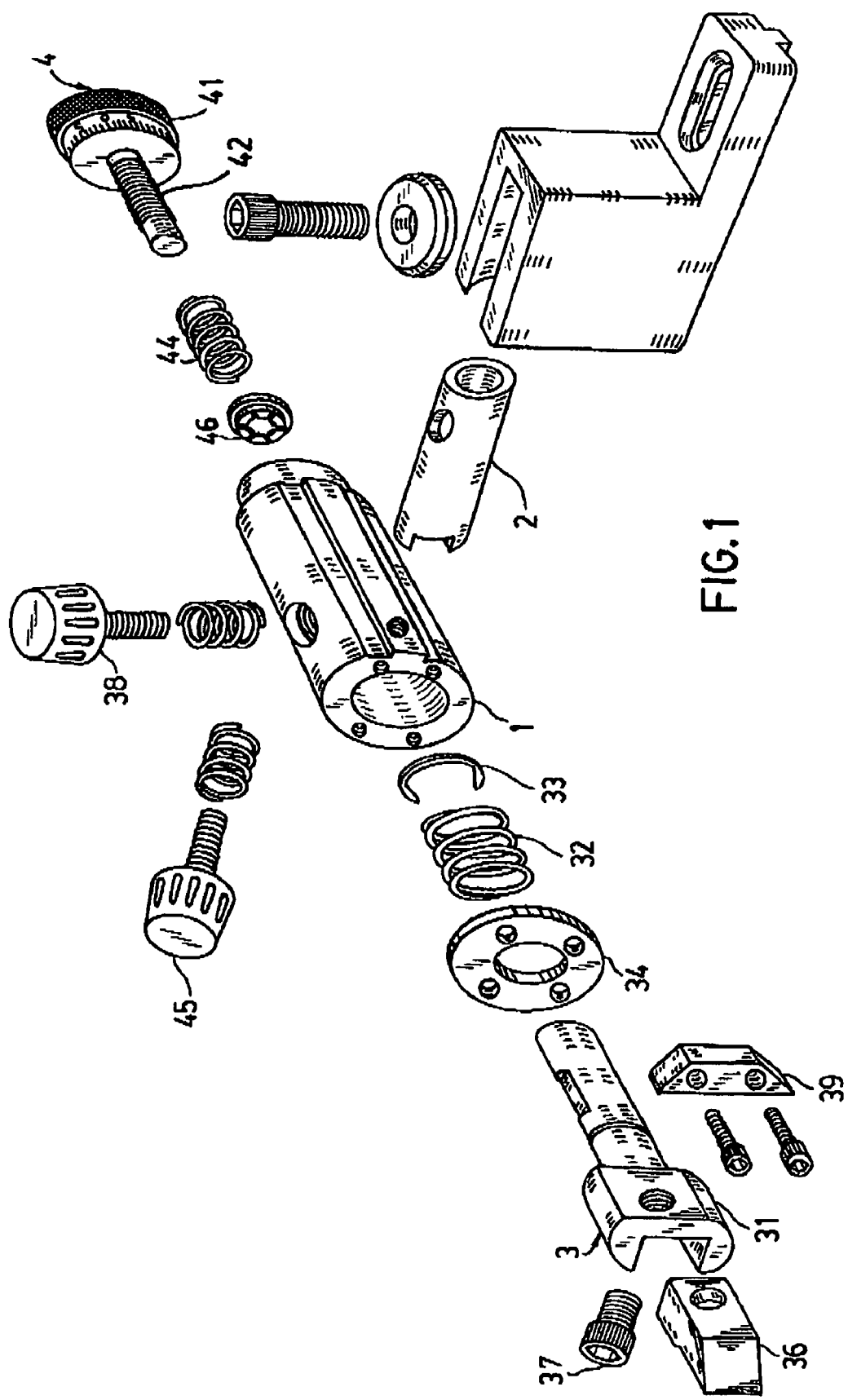
FIG. 1 is a perspective view of a stylus for key duplicating machine with replaceable segmented stylus according the present invention.
Figure 2:
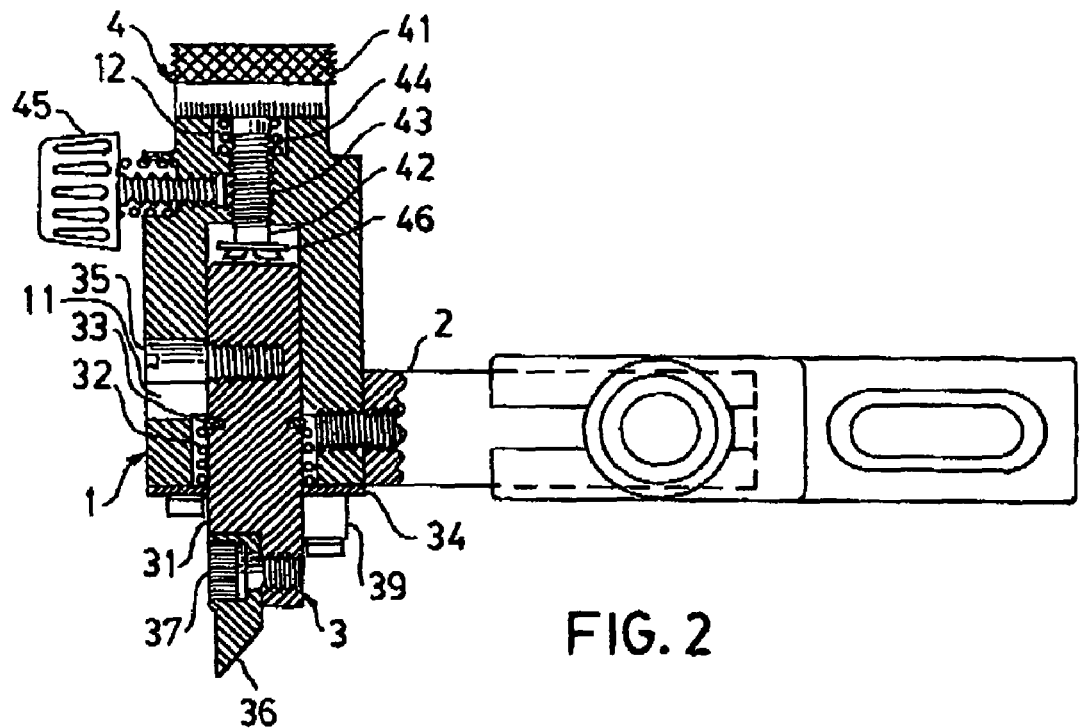
FIG. 2 is a partial sectional top view of a stylus for key duplicating machine with replaceable segmented stylus according the present invention.
Figure 3:
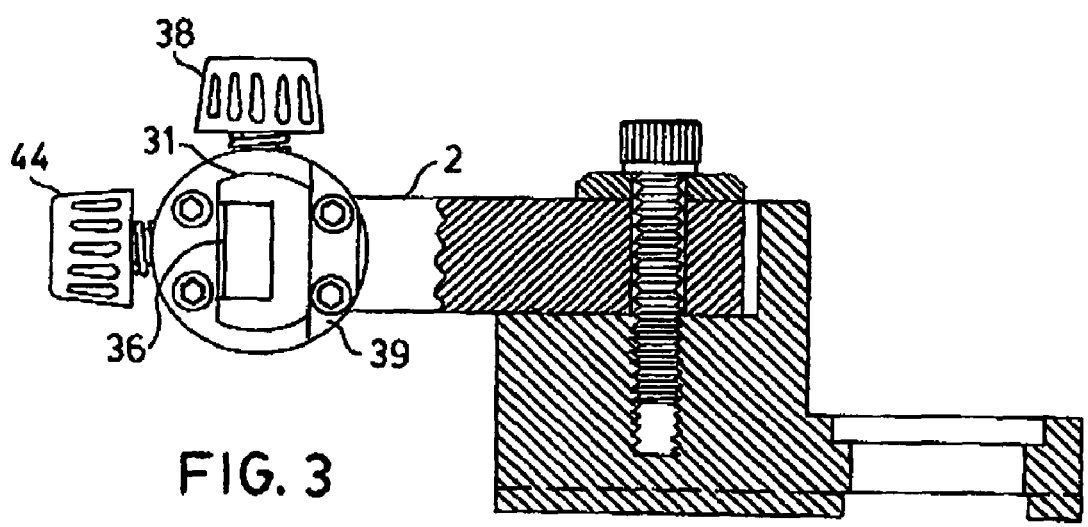
FIG. 3 is a partial sectional front view of a stylus for key duplicating machine with replaceable segmented stylus according the present invention.

Referring to FIGS. 1-3, a stylus for key duplicating machine with replaceable segmented stylus which is an embodiment of the present invention comprises a cylindrical body 1; an arm 2 laterally secured at one end on the periphery of the cylindrical body, and laterally movably arranged at the other end on a substrate of the key duplicating machine (not shown) for accommodating different duplicating distances of various clamping devices; a retractable spring-loaded tracer movably engaged in one end of the cylindrical body 1; and a regulating grip angularly movably engaged in the other end of the cylindrical body.

The retractable spring-loaded tracer 3 comprises a slide spindle 31 which can be movably engaged in the front interior of the cylindrical body 1 and sustaining a front end exposed from the cylindrical body; a compression spring 32 which is engaged between the front inner wall of the cylindrical body 1 and the intermediate periphery of the slide spindle 31, and between a C-shaped stopper 33 laterally secured on the slide spindle and an annular cover sheet 34 secured at the front end of the cylindrical body, for biasing the slide spindle backward; a lateral stopper 35 which is laterally secured on the intermediate portion of the slide spindle, and protrudes into an elongated elliptical slot 11 formed on the front side wall of the cylindrical body, for locating the slide spindle; a wedge-shaped segmented stylus 36 which is made by the medium carbon steel, and formed in a relatively small separate segmented block, and having a counterbore formed thereon in order that the wedge-shaped segmented stylus can be secured on the front flat portion of the slide spindle by means of a counter sunk screw 37, for forming a releasable segmented stylus. Furthermore, in the present invention, a screw 38 with spring is provided on the intermediate top wall of the cylindrical body 1, for pressing against the slide spindle 31, by turning the same, in order that the movement of the slide spindle can be stopped, and a stationary stylus can be formed, and a retractable spring-loaded tracer can be restored by loosening the screw 38. Further, a guide 39 is secured on the annular cover sheet 34, and having an upright guide surface formed for touching and guiding the front flat portion of the slide spindle, in order to sustain an upright movement of the slide spindle caused from the retractable spring force exerted from the retractable spring-loaded tracer, and to always maintain the wedge-shaped segmented stylus in an upright status.

The regulating grip 4 comprises a disc 41; a screw 42 which is secured at the center portion of the disc, for engagement with the female thread portion 43 provided at the rear interior of the cylindrical body, and having an end portion extended over the female thread portion to enable the same to press against the rear end portion of the slide spindle, in order to have the slide spindle 31 being slightly moved forward by slightly turning the disc 41 clockwise, or to enable the slide spindle 31 being slightly moved backward by means of the spring force exerted from the compression spring 32 by slightly turning the disc 41 counter clockwise, for attaining the objective of slightly regulating the movement amount of the segmented stylus. A relatively large slow 12 is provided in the rear center portion of the cylindrical body for receiving a compression spring 44, and passing the screw 42, in order that the compression spring 44 can press against the disc 41 for preventing the screw 42 from being moved due to the vibration caused from running of the key duplicating machine by means of the spring force exerted from the compression spring 44. IN the present invention, a screw 45 with spring is engaged in the rear end wall of the cylindrical body, for pressing against the screw 42 by turning the same, in order to prevent the screw 42 from being moved, and to have the retractable spring-loaded tracer being useless, and become a stationary stylus. However, by simply loosening the screw 45, a retractable spring-loaded tracer can be effectively restored. Furthermore, a speed nut 46 is secured at the end of the screw 42 for preventing the latter from being removed from the cylindrical body.

As described above, due to the fact that the wedge-shaped segmented stylus in accordance with the present invention is formed in a relatively small separate segmented block, and releasably secured on the front flat portion of the slide spindle, once the wedge-shaped segmented stylus has been worn out, and became useless, such relatively small separate segmented stylus can only be easily replaced by new one without losing the whole set of the stylus, in order to maintain a high degree of key duplicating accuracy, and to save the cost of the stylus.

The invention claimed is:

1. A stylus for key duplicating machine with replaceable segmented stylus comprising:
   a cylindrical body having a stopper disposed within the cylindrical body;
   a spring-loaded tracer having a slide spindle movably engaged within the cylindrical body and biased backward by engagement of a spring with the stopper and a front wall of the cylindrical body towards a rear end of said cylindrical body;
   a replaceable segmented stylus releasably secured on a front end of said slide spindle for easy replacement of said replaceable segmented stylus damaged during key duplicating by a new one; and
   a regulating grip angularly movably engaged to the rear end of said cylindrical body.

2. The stylus for key duplicating machine with replaceable segmented stylus as claimed in claim 1, wherein said regulating grip comprises a disc, a screw vertically secured at a center of said disc, and threadedly engaged in the rear end of said cylindrical body, and having an end portion extending into said cylindrical body for pressing against one end of said slide spindle; said spring being a compression spring received in an interior of said front end of said cylindrical body for biasing said slide spindle, and to enable other end of said slide spindle to be exposed from said cylindrical body; and a guide secured on said one end of said cylindrical body, for touching and guiding a flat portion of said slide spindle.

3. The stylus for key duplicating machine with replaceable segmented stylus as claimed in claim 2, wherein said compression spring is engaged in between the front wall of said cylindrical body and intermediate periphery of said slide spindle, and said stopper is a C-shaped stopper laterally secured on said slide spindle and an annular cover sheet secured on said front end of said cylindrical body, for biasing said slide spindle backward, in order to enable said spindle to press against an end of said screw.

* * * * *